US007481706B2

(12) United States Patent
Dodge

(10) Patent No.: US 7,481,706 B2
(45) Date of Patent: Jan. 27, 2009

(54) METHOD FOR PLAYING KENO WITH SIDE BETS

(75) Inventor: Clifford B. Dodge, Billings, MT (US)

(73) Assignee: Gametech International, Inc.., Reno, NV (US)

( * ) Notice: Subject to any disclaimer, the term of this patent is extended or adjusted under 35 U.S.C. 154(b) by 322 days.

(21) Appl. No.: 11/337,031

(22) Filed: Jan. 21, 2006

(65) Prior Publication Data

US 2007/0173312 A1 Jul. 26, 2007

(51) Int. Cl.
*A63F 3/06* (2006.01)
*A63F 13/00* (2006.01)

(52) U.S. Cl. .......................... 463/18; 273/139; 273/269

(58) Field of Classification Search ................. 273/139, 273/269; 463/18
See application file for complete search history.

(56) References Cited

U.S. PATENT DOCUMENTS 6,368,212 B1 * 4/2002 Moody ........................ 463/13
6,478,677 B1 * 11/2002 Moody ........................ 463/18
2003/0017867 A1 * 1/2003 deKeller ...................... 463/18

* cited by examiner

*Primary Examiner*—Benjamin H Layno
(74) *Attorney, Agent, or Firm*—Dillon & Yudell LLP

(57) ABSTRACT

A novel Keno game is disclosed wherein a player selects up to ten numbers from a field of eighty numbers to be played and these numbers are compared to twenty numbers randomly selected by the game from the same field of numbers in a manner known in the prior art. When the player places one or more conventional bets on the outcome of the game, they now also place one or more side bets as to the number of hits or matches there will be between the player selected numbers and twenty numbers selected by the game computer. The player may place side bets on more than one number of hits or matches to increase their odds of achieving side bet winnings.

11 Claims, 6 Drawing Sheets

Main Bets and Side Bets

| Qty. of # Picked | Number of Hits | Winnings Per Bet |
|---|---|---|
| 1 | 1 | 0 |
| 2 | 2 | 13 |
| 3 | 2 | 3 |
| 3 | 3 | 23 |
| 4 | 2 | 1 |
| 4 | 3 | 7 |
| 4 | 4 | 45 |
| 5 | 3 | 6 |
| 5 | 4 | 12 |
| 5 | 5 | 240 |
| 6 | 3 | 3 |
| 6 | 4 | 8 |
| 6 | 5 | 24 |
| 6 | 6 | 400 |
| 7 | 4 | 8 |
| 7 | 5 | 30 |
| 7 | 6 | 220 |
| 7 | 7 | 400 |

Main Bets and Side Bets

| Qty. of # Picked | Number of Hits | Winnings Per Bet |
|---|---|---|
| 8 | 4 | 5 |
| 8 | 5 | 12 |
| 8 | 6 | 65 |
| 8 | 7 | 130 |
| 8 | 8 | 800 |
| 9 | 4 | 3 |
| 9 | 5 | 7 |
| 9 | 6 | 25 |
| 9 | 7 | 63 |
| 9 | 8 | 225 |
| 9 | 9 | 800 |
| 10 | 4 | 2 |
| 10 | 5 | 4 |
| 10 | 6 | 10 |
| 10 | 7 | 40 |
| 10 | 8 | 135 |
| 10 | 9 | 800 |
| 10 | 10 | 1600 |

FIGURE 8

METHOD FOR PLAYING KENO WITH SIDE BETS

FIELD OF THE INVENTION

This invention generally relates generally to video gaming machines and more particularly to an interactive keno game.

BACKGROUND OF THE INVENTION

Conventional Keno is a well known game. There are eighty numbers in a pool—typically eighty keno balls numbered 1 through 80 and maintained in an air blower device that circulates the Keno balls. Twenty of the eighty Keno balls are selected each round of game play.

Each player has a Keno ticket that is an 8×10 matrix with the eighty numbers printed thereon. Each player marks their ticket with between one and fifteen of the eighty numbers that the player thinks will be drawn during the game. The player also makes an appropriate wager. Depending on the number of matches between the twenty numbers drawn and the numbers selected and marked by the player on their play card, the player wins or loses. The more matching numbers there are the higher the payoff to the player.

In electronic Keno, a single player plays against a computer controlled video gaming machine for each round of game play and the player either wins or loses each round. No other players are involved. At the beginning of game play the player selects between one and ten numbers and wagers one or more coins, tokens or credits. The computer of the video gaming machine randomly selects twenty numbers from a pool of eighty numbers and then compares the twenty numbers to the player selected numbers to determine if the player has achieved a winning payout for the round of game play. The player selections are made by using a light pen, pressing numbered buttons on a selection panel, or by touching numbers displayed on-screen using conventional video touch screen technology.

In the typical video Keno format, the player may select between one and ten numbers to attempt to match the randomly selected numbers. When the player presses a "Start" button, the computer of the video gaming machine randomly selects twenty numbers from the total pool of eighty numbers. Just as in live Keno, the player has winnings based on how many of their selected numbers match the randomly selected twenty numbers. The player's winnings are greater as there are more matches. If the player matches less than a predetermined minimum number of selected numbers, the player loses.

Keno games, alike other wagering games are more successful, when players are provided with a sense of participation and control, the opportunity to make decisions, reasonable odds of winning, and what the players perceive is an improved chance to beat the odds that are normally in favor of a casino or game owner.

Over time gaming patrons become bored with standard versions of games, including Keno, and game owners are continually looking for new variations of the games to create renewed interest and to attract more players to play the games.

It would therefore be advantageous to have a new Keno game which is similar to conventional Keno games but which provides for greater player interaction with the game, and which would appear to provide additional opportunities for winning. Such a new Keno game would stimulate renewed interest of experienced players, and the interest of casual players, who will experience new excitement with the new interactive Keno game.

SUMMARY OF THE INVENTION

The present invention combines the most desirable elements of conventional Keno games with a novel improvement that gives a player more sense of participation, the opportunity to make decisions, reasonable odds of winning, and what the players perceive is a chance to beat odds that are normally in favor of a game owner. The result is a novel "Side Bet Keno" game.

The player initially selects between two and ten numbers to play from a pool of eighty numbers in a manner well known in the Keno art by touching between two and ten of the eighty numbers displayed on a video screen equipped with touch screen technology. All eighty numbers are displayed in an 8×10 matrix and the player selected play numbers are highlighted in some manner in the matrix as in the prior art. The player also places a main wager or bet on the game outcome as in the prior art.

In accordance with the teaching of the invention, before starting each round of Keno game play the player may also place side bets as to how many matches or hits there will be between the ten player selected numbers and twenty numbers selected by the game computer. The player may place a variable number of bets on whether or not there will be anywhere between two and ten matches between the player selected numbers and the twenty numbers selected by the game computer. The odds of having a high percent of number matches, such as ten number matches or hits, is so small that the player will most likely never place any bets on there ever being any high match. The odds of having two, three or four number matches or hits is much higher the player will most likely place some number of bets on such matches during each round of game play. The player may also place any number of side bets on any quantity of number matches or hits. That is, the player may place some number of side bets on there being three number matches and place a different number of side bets on there being two number matches.

After the player places a main wager or bet on game play, as in the prior art, and any number of side bets in accordance with the teaching of the present invention, the player touches a Start button and the game computer randomly selects and displays twenty numbers from the pool of eighty numbers in a manner known in the Keno art. The twenty numbers are displayed adjacent to or in the 8×10 display matrix. The number of matches between the player selected numbers and the twenty numbers randomly selected by the game computer determines the player's winnings.

In accordance with the teaching of the invention the players winnings for each round of Keno game play comprise the total of the normal winnings based on the number of hits or number matches and the number of bets placed by the player on the round of game play, plus the new additional winnings based on the number of side bets the player has placed on the actual number of number matches or hits for each round of game play.

DESCRIPTION OF THE DRAWINGS

The invention will be better understood upon reading the following Detailed Description in conjunction with the drawing in which:

FIG. 8 shows a pay table for the main bets and side bets for the Side Bet Keno game.

DETAILED DESCRIPTION

Figure 1:
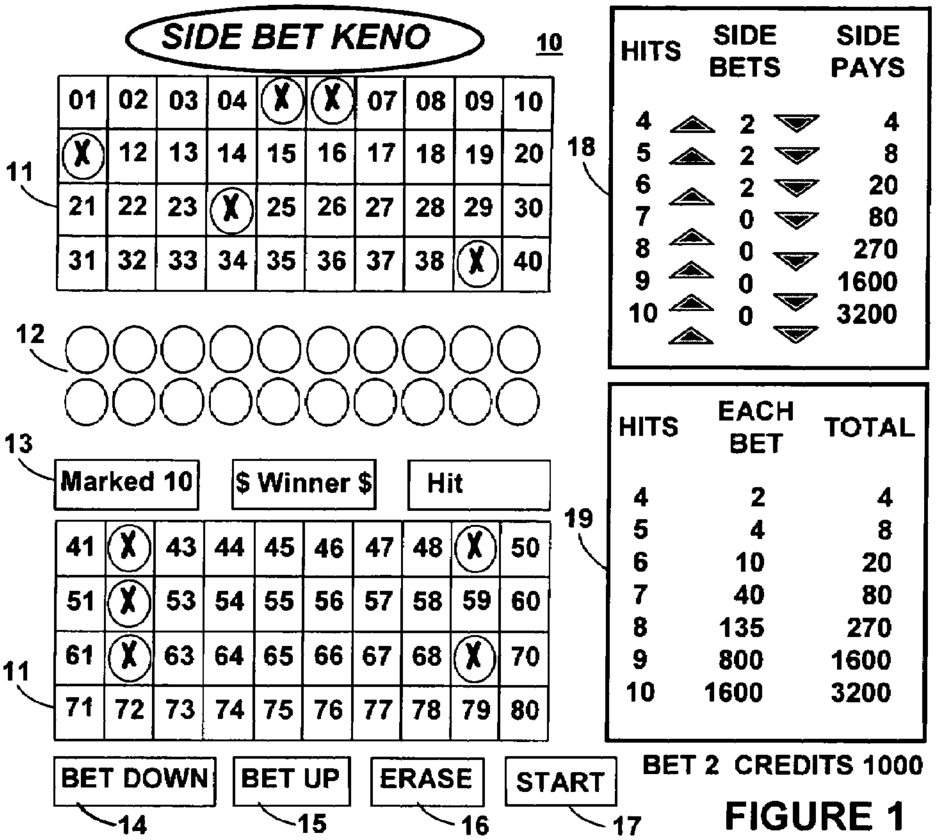
FIG. 1 shows the video display of the novel Side Bet Keno game with a conventional 8×10 number display matrix with ten player selected numbers displayed thereon, a place to display the twenty game computer selected numbers, the ability to place main bets on the game play and the display of those bets, and an area to place and display side bets on the round of Keno game play, all before the start of a round of game play.

The present invention combines the most desirable features of existing Keno games with a novel improvement that gives a player more sense of participation and control, the opportunity to make decisions, reasonable odds of winning, and what the players perceive is a chance to beat odds that are normally in favor of a casino. The result is a more desirable Keno game called "Side Bet Keno" and is played on a video gaming machine equipped to provide touch screen operation. The use of touch screen technology with gaming machines is well known in the video gaming art. As specific locations on a video screen are touched during game play the touch is sensed by a game computer and appropriate game action is taken.

The improvement is achieved with a standard Keno game in which a player first conventionally selects between two and ten numbers from a total of eighty numbers (1-80), and places a number of bets on the outcome of the game in a conventional manner. Per the teaching of the present invention the player then places side bets on the quantity of number matches or hits that will occur during the round of game play. After the player touches a Start button the game computer randomly selects twenty numbers from the same eighty numbers. The computer then compares the twenty randomly selected numbers with the player selected numbers. If there are a predetermined number of matches between these two sets of numbers the player will have winnings based upon the number of bets they placed in a manner known in the prior art.

In addition, if the player has placed one or more side bets on the number of hits or number matches that actually occur during the round of game play the player achieves additional game winnings based upon the number of side bets they placed. This increases the chances of how much the player may win for the round of game play.

The player may select any one or ones of two through ten possible number matches and place one or more bets thereon as the player chooses. The odds of having a high percent of number matches, such as ten number matches or hits, is so small that the player will most likely never place any bets on there ever being any high match. The odds of having two, three or four number matches or hits is much higher the player will most likely place some number of bets on such matches during each round of game play. The player may also place any number of side bets on any quantity of number matches or hits. That is, the player may place some number of side bets on there being three number matches and place a different number of side bets on there being two number matches. Since the odds of having nine or ten number matches or hits during a round of game play are so small the player will probably never place any side bets thereon. Since three, four or five number matches or hits are much more likely to occur during game play the player will probably place side bets thereon. In addition, the player will probably place more side bets on four number matches or hits rather than five, six or seven number matches or hits which will occur less frequently. The winnings achieved on picking the number of number matches or hits that occur during a round of game play are based on a pay table that takes into consideration the odds of the different events occurring and the number of side bets a player places on the number of number matches that occur.

FIG. 1 shows the video display 10 of the novel Side Bet Keno game. There is a conventional 8×10 number display matrix 11 that has the numbers 1 through 80 displayed thereon. During a round of game play a player selects between two and ten numbers to be played which are displayed on matrix 11. The numbers are selected by the player touching the display screen 10 at the location of selected numbers. Player selected numbers are marked by an "X" as shown.

In FIGS. 2-6 are shown five rounds of Side Bet Keno game play. For the sake of simplicity the player is playing the same maximum of ten numbers 5, 6, 10, 24, 39, 42, 49, 52, 62 and 69 for all five rounds of game play. However, the player can change their selection of numbers for each round of Side Bet Keno game play by merely re-touching a number to deselect it and the "X" marking disappears. The player then touches a different number and that new number is marked with an "X". The player may also touch Erase button 16 to remove all previously chosen numbers and then select new numbers.

There is also a field 12 of twenty positions (hereinafter called the "20× display 12") in which are displayed the twenty numbers randomly selected by the game computer during each round of Side Bet Keno game play. In FIG. 1 there are no numbers displayed in 20× display 12 because the player has selected ten numbers and placed bets, but has not yet touched the Start button 17. Start button 17 is not initially displayed on display 10 in FIG. 1, but once a player selects at least two numbers and places bets, Start button 17 is displayed as shown in FIGS. 2-6.

There are also other well known elements of a Keno game such as Bet Down button 14 which is touched by a player to decrease their number of conventional bets on a round of Keno game play. Bet Up button 15 is touched by a player to increase their number of conventional bets on a round of Keno game play. Erase button 16 is touched by the player to erase all numbers they have selected on 8×10 number display matrix 11. As described above Start button 17 appears on display 10 after numbers have been selected and bets placed by the player. Responsive to the player touching Start button 17 at the start of each round of game play the game computer randomly selects twenty numbers between one and eighty, such as shown in 20× display 12 in FIGS. 2-6. There is also an indicator of the number of credits a player has to use to during game play which is displayed under field 19 in FIGS. 1-6. For the examples described herein the player commences game play with 1000 credits as shown in FIG. 1. The number of credits increase and decrease during game play as there are winnings or no winnings as described with reference to FIGS. 2-6. Adjacent to the display of the player's credit total is an indication of the number of bets a player is placing on each round of game play. For the examples described herein the player is placing two bets (credits) on the first through fourth rounds of game play as shown in FIG. 1-5, but changes the number of bets to three bets for the fifth round of game play as shown in FIG. 6. Before Start button 17 is touched to commence each round of game play the player may change the amount of their bet using buttons 14 and 15.

Figure 2:
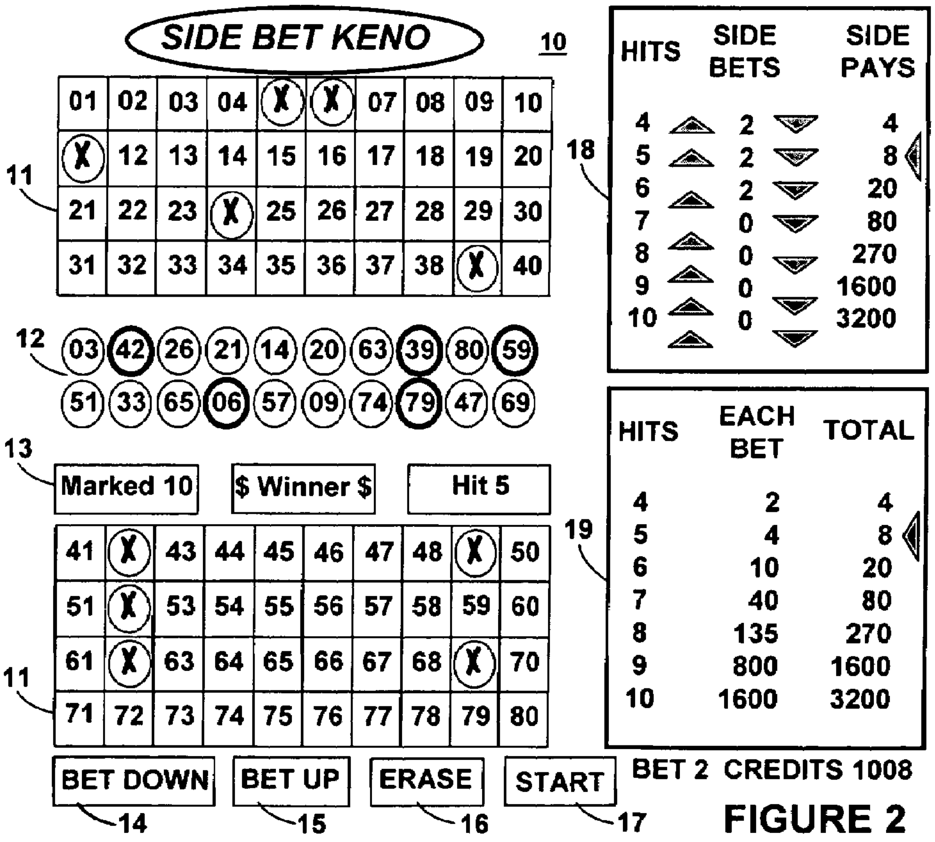
FIG. 2 shows the video display of the novel Side Bet Keno game after the start of a first round of Keno game play with there being five number matches between the ten player selected numbers and the twenty game computer selected numbers, a display of the winnings for the player's two bets on the game, and a display of the winnings resulting from player's two side bets on there being five number matches for the round of game play.
Figure 3:
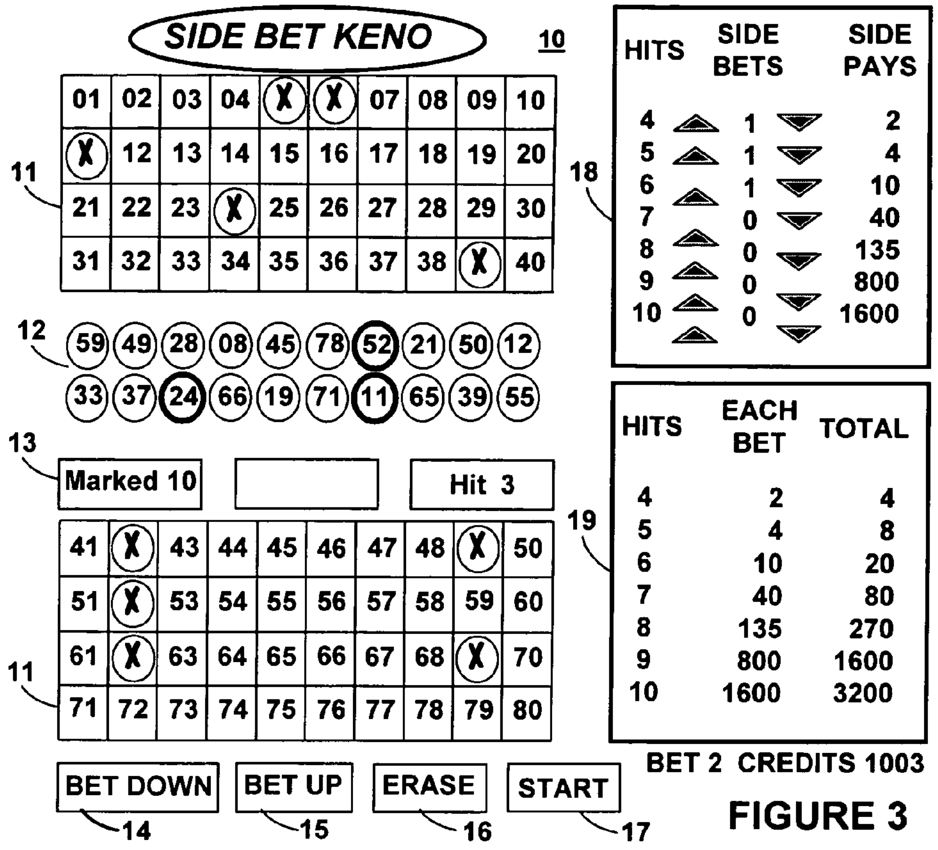
FIG. 3 shows the video display of the novel Side Bet Keno game after the start of a second round of Keno game play with there being only three number matches between the ten player selected numbers and the twenty game computer selected numbers, which is not enough matches or hits to achieve any winnings for the player's two bets on the game or to achieve any winnings on side bets on the game.
Figure 4:
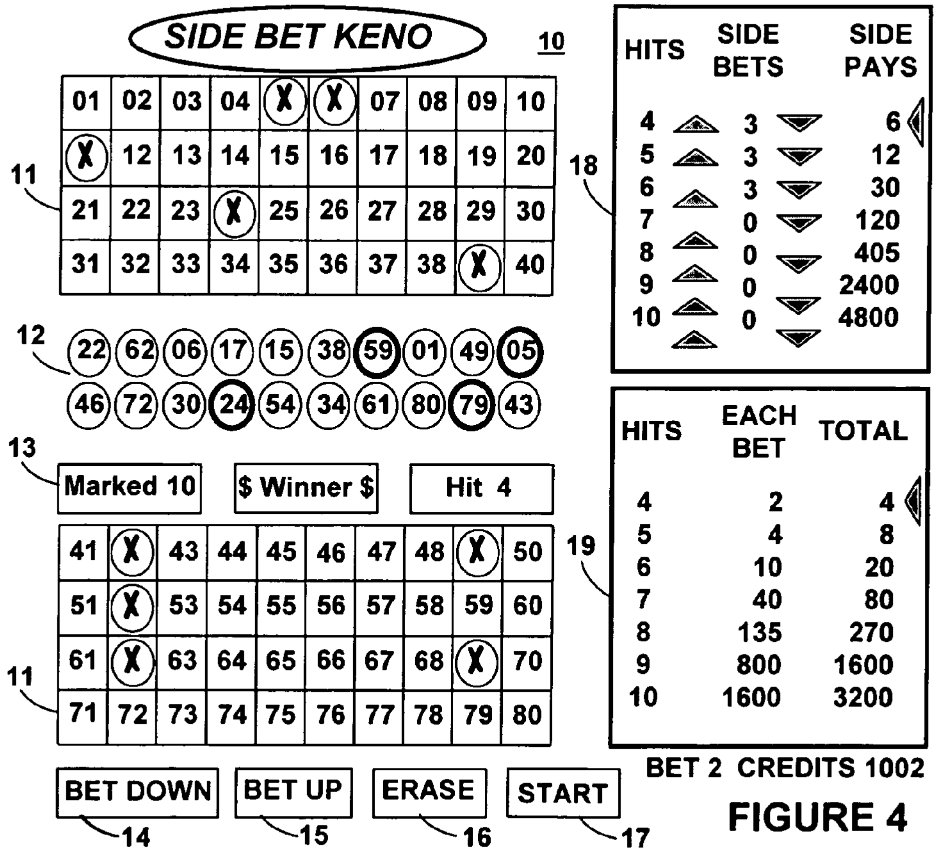
FIG. 4 shows the video display of the novel Side Bet Keno game after the start of a third round of Keno game play with there being four number matches between the ten player selected numbers and the twenty game computer selected numbers, a display of the winnings for the player's two bets on the game, and a display of the winnings resulting from the player's three side bets on there being four number matches for the round of game play.
Figure 5:
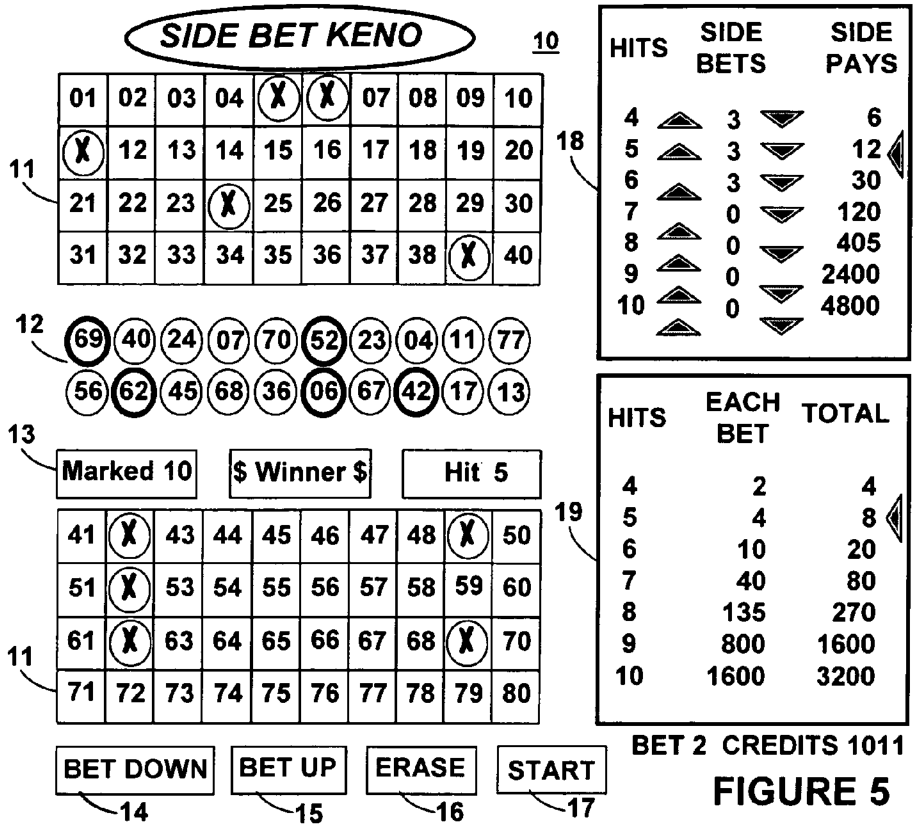
FIG. 5 shows the video display of the novel Side Bet Keno game after the start of a fourth round of Keno game play with there being five number matches between the ten player selected numbers and the twenty game computer selected numbers, a display of the winnings for the player's two bets on the game, and a display of the winnings resulting from the player's three side bets on there being five number matches for the round of game play.
Figure 6:
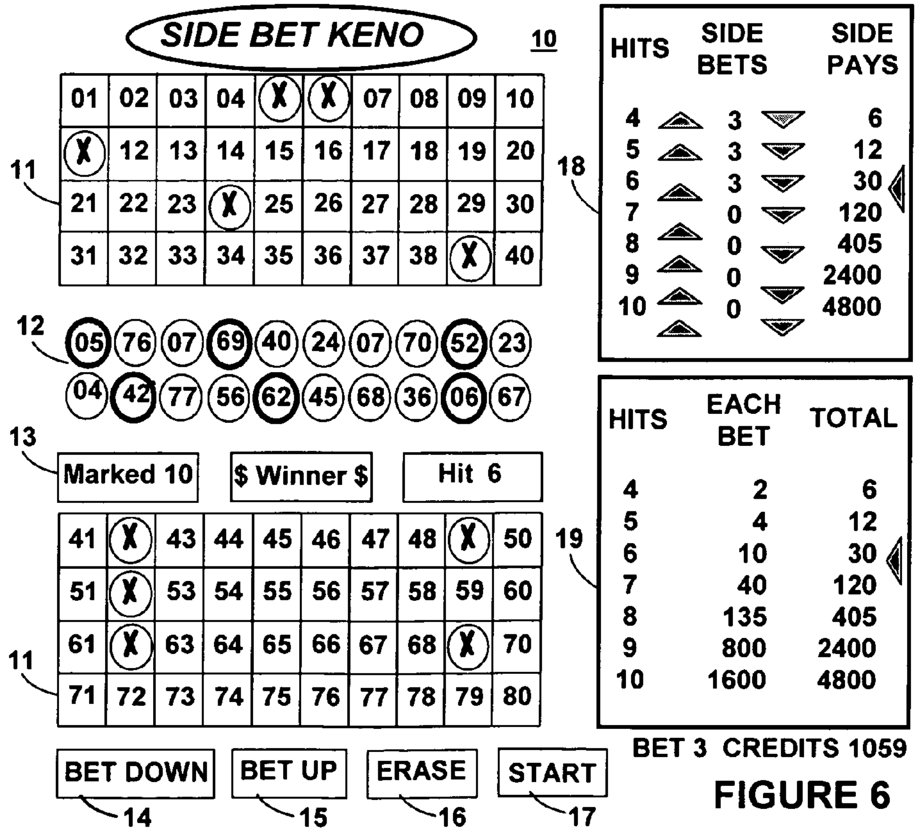
FIG. 6 shows the video display of the novel Side Bet Keno game after the start of a fifth round of Keno game play with there being six number matches between the ten player selected numbers and the twenty game computer selected numbers, a display of the winnings for the player's three bets on the game, and a display of the winnings resulting from the player's three side bets on there being six number matches for the round of game play.

In Field 19 of each of FIGS. 1-6 is displayed a pay table for each round of game play and it reflects the number of credits that may be won per bet placed by the player for each number of hits or number matches. The pay table is described in greater detail hereinafter with reference to the larger pay table shown in FIG. 7. The pay table displayed in field 19 changes automatically to take into account the quantity of numbers (between two and ten) selected by the player to be played for each round of Keno game play and the number of bets the player has placed on the round of game play. The number of credits that may be won by a player for each bet that they place on a round of game play and for the number of hits or number matches is shown in field 19 under the column entitled "Each Bet". In FIGS. 1-5 the player has placed two bets/credits on the first through the fourth rounds of Keno game play, and three bets/credits on the fifth round of Keno game play. Taking these factors into account the players possible winnings are then shown under the column entitled "Total". For the placement of two bets it is double that shown in the Each Bet column. Thus, for the first through fourth rounds of Keno game play, shown in FIGS. 1 through 5, where the player has placed two bets on those rounds of game play, if they have five number matches or hits, they win eight credits, if they have four number matches or hits, they win four credits, and so forth. More particularly, in FIG. 2 there are five number matches so the player wins eight credits as indicated by the left pointing arrow at the right side of the five hits row in field 19. In FIG. 3 there are only three number matches or hits so there are no winnings because three hits are not in the pay table in field 19. In FIG. 4 there are four hits and with two bets the player wins four credits as indicated by the left pointing arrow at the right side of the four hits row in field 19. In FIG. 5 there are five hits and with two bets the player wins eight credits as indicated by the left pointing arrow at the right side of the five hits row in field 19. Finally, in FIG. 6 there are six hits and with three bets the player wins thirty credits as indicated by the left pointing arrow at the right side of the six hits row in field 19.

In FIGS. 1-6 is shown a new Side Bet field 18 on display 10 in accordance with the teaching of the invention. Side Bet field 18 is used to implement the teaching of a preferred embodiment of the present invention. In field 18 there are five columns. The first, third and fifth columns have titles. The second column has upward pointing arrows and the fourth column has downward pointing arrows. Column one is entitled "Hits" and the row in the first column that is used during a round of Keno game play matches the actual number of hits or number matches that actually occur for that round of game play. The third column indicates the number of side bets placed by a player on player selected ones of the possible number matches. The fifth column is entitled "Side Pays" and indicates the number of credits won when the actual quantity of number matches or hits for a round of game play has been bet upon by the player as a side bet. The full pay table is shown and described with reference to FIG. 8.

In FIG. 1 the player has selected to place two side bets on there being 4, 5 or 6 hits or number matches during the first round of Side Bet Keno game play. They do this by twice touching the upward facing arrow immediately adjacent to the number 4, 5 or 6 in the Hits column. This is a total of six bets or credits placed on side bets and is deducted from the player's total credits. Every time an upward facing arrow is touched the number of indicated Side Bets is increased by one. The player may decrease the number of their individual side bets by touching the downward facing arrow in the fifth column in the row adjacent to any particular number of hits or number matches. The player may also place different side bets for different hits or number matches. In FIG. 1 the player gambles that the chance of their being 7, 8, 9 or 10 hits or number matches is so small that they do want to make any side bets thereon, but has bet two bets on there being 4 through 6 hits. In the rounds of Side Bet Keno play reflected in FIGS. 3 through 6 the player has decreased their side bets to one on their being one of four through six hits during those rounds of game play. In the rounds of Side Bet Keno play reflected in FIGS. 4 through 6 the player has increased their side bets to three on their being one of four through six hits during those rounds of game play. The player may also place different side bets on each number of hits. For example, the player may place three side bets on there being two hits or number matches, may place two side bets on there being three hits or number matches, and may place one side bets on there being three hits or number matches.

The amount of winnings achieved by a player on a side bet is indicated in the Side Pays column in field 18. The amount displayed changes dynamically and automatically during game play and reflects the number of side bets placed by the player and the quantity of numbers selected by the player in 8×10 matrix 11. In FIGS. 1 and 2 two side bets have been placed on there being four, five or six hits and the player wins four credits because there are four hits during the first round of game play. However, if only one bet had been placed the winning would be only two credits as shown in FIG. 3. Similarly, if three side bets had been placed, as in FIGS. 4 through 6, the winnings would be six credits for four hits.

At the commencement of game play the player selects from two to ten numbers in 8×10 table 1 by touching ones of the numbers and the selected numbers are indicated by the display of an "X" as shown in FIGS. 1-6. In the Side Bet Keno game examples described herein with reference to FIGS. 1 through 6 the player has selected ten numbers to play and they are the same ten numbers for all five games. This is done for simplicity to avoid describing number selections for each of the five games. The number of selected numbers is shown in row 13 as "Marked 10". However, the player may change any or all of their selected numbers for each round of game play.

The player also places a main bet, which is two credits as indicated beneath field 19 in FIGS. 1-5, and is three credits as indicated beneath field 19 in FIG. 6, and the player makes a number of side bets as indicated in Side Bet field 18. The number of side bets vary through FIGS. 1-6. Following a round of game play, if the player does not wish to make any changes in their selected numbers or their main or side bets they merely touch Start button 17 to commence another round of game play. At the commencement of the first round of game play Start button 17 is touched and video display 10 changes to that shown in FIG. 2. The game software randomly selects twenty numbers in the range of one to eighty and displays these numbers in 20× display 12 in FIG. 2. The game program also compares the ten player selected numbers displayed in field 11 against the twenty randomly selected numbers selected by the game program and indicates the matches by the dark circles around the numbers. In the first round of game play there are five hits or number matches with the numbers 06, 39, 42 59 and 79. This number of hits is displayed in row 13 as "Hit 5".

Being as there are at least four hits, the lowest number of hits in the table in each of fields 18 and 19, the player has achieved winnings and this is indicated to the player by flashing "$Winner$" in row 13 for several seconds. The amount of the winnings are indicated to the player by the left facing arrow in Side Bet field 18 in the row Hites 1marking eight credits, and the left facing arrow in main bet field 19 in the row Hits 5 marking eight credits. These left pointing arrows may blink to call the player's attention to what they have won. Thus, the player has won a total of sixteen credits. While this total is not displayed in a single location in FIG. 2 a new field could be added to indicate the total credit winnings.

Initially the player started game play with 1000 credits and they placed two bets (credits) on the main game play and a total of six bets (credits) on side bets. Two bets for each of four hits through six hits. These eight bets lower their total credits to 992 credits. This would be normally shown to the player before they touch Start button 17. After Start button 17 is touched and it is determined that the player has won a total of sixteen credits the credit total is revised to 1008 credits as shown beneath field 19 in FIG. 2.

As the player progresses to a second round of Side Bet Keno game play we move to FIG. 3. The player does not change their ten selected numbers by touching them in 8×10 display area 11. They also do not change their main bet of two credits using buttons 14 or 15. They do change their side bets on there being 4, 5, or 6 hits or number matches during the second round of game play to one bet as indicated in field 18 in FIG. 3. They make the change by touching the down facing arrow once in each the three Hit rows for 4, 5 and 6 hits.

The player then touches Start button 17 and the twenty randomly selected numbers are displayed in 20× display area 12 in FIG. 3. The game program then compares the ten player selected numbers against the twenty numbers randomly selected by the game program and then indicates the matches by the dark circles around the numbers. In the second round of game play there are three hits or number matches with the numbers 11, 24 and 52. This number of hits is displayed in row 13 as "Hit 3". Three hits is not enough to achieve any winnings so $Winner$ in area 13 is not displayed and flashed. There are no winnings so there are no left facing arrows in fields 18 and 19 pointing to any winnings.

Initially the player started game play with 1008 credits and they placed two bets (credits) on the main game play and a total of three bets (credits) on side bets. One bet for each of four hits through six hits. This lowers their total credits to 1003 credits. This would be normally shown to the player before they touch Start button 17. After Start button 17 is touched and it is determined that the player has not won any credits the remaining credit total is revised to 1003 credits as shown in FIG. 3.

As the player progresses to a third round of Side Bet Keno game play we move to FIG. 4. The player does not change their ten selected numbers by touching them in 8×10 display area 11. They also do not change their main bet of two credits by touching buttons 14 or 15. They do change their side bets on there being 4, 5, or 6 hits or number matches during the third round of game play to three bets as indicated in field 18 in FIG. 3. They make the change by twice touching the upward facing arrow in each of the three Hit rows for 4, 5 and 6 hits.

The player then touches Start button 17 and the twenty randomly selected numbers are displayed in area 12 in FIG. 4. The game program then compares the ten player selected numbers against the twenty numbers randomly selected by the game program and then indicates the matches by the dark circles around the numbers. In the third round of game play there are four hits or number matches with the numbers 05, 24, 59 and 79. This number of hits is displayed in row 13 as "Hit 4".

Being as there are four hits, the lowest number in the table in each of fields 18 and 19, the player has achieved winnings and this is indicated to the player by flashing "$Winner$" in row 13 for several seconds. The amount of the winnings are indicated to the player by the left facing arrow in Side Bet field 18 in the row Hits 4 marking six credits, and the left facing arrow in main bet field 19 in the row Hits 4 marking four credits. Thus, the player has won a total of ten credits. The left facing arrows may be blinked to call the player's attention to their winnings.

Initially the player started the third round of game play with 1003 credits and they placed two bets (credits) on the main game play and a total of nine bets (credits) on side bets. Three bets for each of four hits through six hits. This lowers their total credits to 991 credits. This would be normally shown to the player before they touch Start button 17. After Start button 17 is touched and it is determined that the player has won ten credits the credit total is revised to 1002 credits as shown in FIG. 4.

As the player progresses to a fourth round of Side Bet Keno game play we move to FIG. 5. The player does not change their ten selected numbers by touching them in 8× display area 11. They also do not change their main bet of two credits by not touching buttons 14 or 15. They do not change their three side bets on there being 4, 5, or 6 hits or number matches during the fourth round of game play and leave them at three bets as indicated in Side Bet field 18 in FIG. 5.

The player then touches Start button 17 and the twenty randomly selected numbers are displayed in 20× display area 12 in FIG. 5. The game program then compares the ten player selected numbers against the twenty numbers randomly selected by the game program and indicates the matches by the dark circles around the numbers. In the fourth round of game play there are five hits or number matches with the numbers 06, 42, 52, 62 and 69. This number of hits is displayed in row 13 as "Hit 5".

Being as there are five hits the player has achieved winnings and this is indicated to the player by flashing "$Winner$" in row 13 for several seconds. The amount of the winnings are indicated to the player by the left facing arrow in Side Bet field 18 in the row Hits 5 marking twelve credits, and the left facing arrow in main bet field 19 in the row Hits 4 marking eight credits. Thus, the player has won a total of twenty credits. These left facing arrows may blink to call the player's attention to their winnings.

Initially the player started the third round of game play with 1002 credits and they placed two bets (credits) on the main game play and a total of nine bets (credits) on side bets. Three bets for each of four hits through six hits. This lowers their total credits to 991 credits. This would be normally shown to the player before they touch Start button 17. After Start button 17 is touched and it is determined that the player has won twenty credits the credit total is revised to 1011 credits as shown in FIG. 5.

As the player progresses to the fifth and final round of Side Bet Keno game play described herein we move to FIG. 6. The player does not change their ten selected numbers by touching them in 8×10 display area 11. They do change their main bet from two credits to three credits by touching Bet Up button 15 once. They do not change their three side bets on there being 4, 5, or 6 hits or number matches during the fifth round of game play as indicated in Side Bet field 18 in FIG. 6.

The player then touches Start button 17 and the twenty randomly selected numbers are displayed in area 12 in FIG. 6. The game program compares the ten player selected numbers against the twenty numbers randomly selected by the game program and indicates the matches by the dark circles around the numbers. In the fifth round of game play there are six hits or number matches with the numbers 05, 06, 42, 52, 62 and 69. This number of hits is displayed in row 13 as "Hit 6".

Being as there are six hits the player has achieved winnings and this is indicated to the player by flashing "$Winner$" in row 13 for several seconds. The amount of the winnings are indicated to the player by the left facing arrow in Side Bet field 18 in the row Hits 6 marking thirty credits, and the left facing arrow in main bet field 19 in the row Hits 6 marking thirty credits. Thus, the player has won a total of sixty credits. These left facing arrows may be blinked to call the player's attention to their winnings.

Initially the player started the fifth round of game play with 1011 credits and they placed three bets (credits) on the main game play and a total of nine bets (credits) on side bets. Three bets for each of four hits through six hits. This lowers their total credits to 999 credits. This would be normally shown to the player before they touch Start button 17. After Start button 17 is touched and it is determined that the player has won sixty credits the credit total is revised to 1059 credits as shown in FIG. 6.

Figure 7:
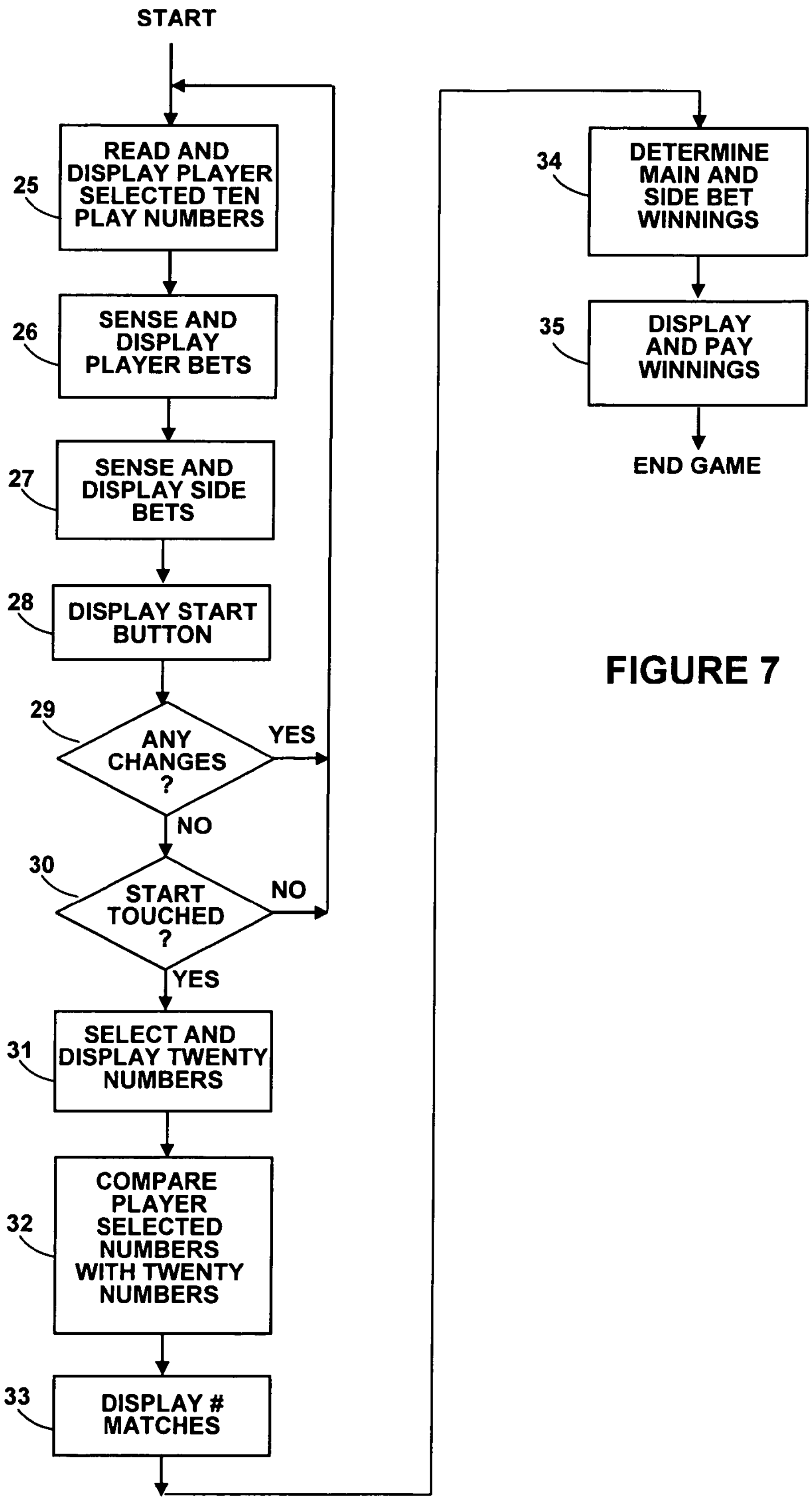
FIG. 7 shows a functional block diagram of the steps involved in the software program used to implement the Side Bet Keno game.

In FIG. 7 is shown a functional block diagram of the steps involved in the software program used to implement Side Bet Keno. The game starts at block 25 waiting for a player to touch ones of the eighty number positions in 8×10 matrix 11 (1-80) indicating the two to ten player selected numbers they wish to play. As the player touches these numbers their selections are detected and are marked in matrix 11 with an "X" as shown in FIGS. 1-6. At block 26 the game program watches for the player to touch Bet Up button 15 and Bet Down button 14 to place one or more main bets on the round of game play. As the player does this the number of bets placed are displayed beneath field 19 as seen in FIGS. 1-6.

After player selected numbers have been picked and a main bet placed using buttons 14 and 15, at block 27 whatever arrows are touched and the number of times they are touched is sensed and displayed to indicate the number of side bets being placed and on what quantity of hits or number matches. The number of times these arrows are touched to place side bets are indicated by the numbering in Total column 5 in field 18 which is the winnings the player will receive if the corresponding number of hits or number matches is achieved during game play. At block 28 the Start button 17 is then displayed.

At decision block 29 the game program periodically determines if the player has again touched any of the up or down facing arrows in columns two and four in Side Bet field 18 indicating that the player is changing their side bets, and if the player has again touched buttons 14, 15 and 16. If the decision is Yes, the program cycles back to block 25 to check for any changes in the player selected numbers and the amount of the player's bets. For example, the player may have touched Erase button 17 deleting all their player selected numbers and is then going to enter a new set of player selected numbers in order to continue game play. The player may have also touched buttons 14 and 15 to change the amount of their main bet. If the decision is No, the program progresses to decision block 30.

At decision block 30 the game program determines if the player has touched Start button 17 indicating the continuation of game play. As long as the software does not detect that Start button 17 has been touched, the game exits block 30 at No and cycles back to the input of block 25 to continue watching for any changes in the player selected game play numbers and changes to the player's main and side bets. Eventually the player will complete their selection of numbers to play and their main and side bets and will touch Start button 17. The program then exits block 30 at Yes and progresses to block 31.

At block 31 the game program randomly selects and displays the twenty numbers that are displayed in 20× area 12 as previously described with reference to FIGS. 2 through 6. At block 32 the program compares the twenty randomly selected numbers in 20× area 12 with the two to ten player selected numbers displayed in 8×10 matrix 11 marked with Xs.

At block 33 the matches from the number comparison performed in block 32 are displayed. In FIGS. 2-6 this is bolding the circle around matching ones of the numbers in 20× area 12. In FIG. 2 these are the numbers 06, 39, 42, 59 and 79. The program then exits block 33 and progresses to block 34 where the player's main bet and side bet winnings are determined based on the number of number matches or hits and their initial bets. If there are an insufficient number of hits or number matches, less than four for the examples shown in FIGS. 2 through 6, no winnings are achieved. This was demonstrated in FIG. 3.

Finally, at block 35 the program displays the main bet and side bet winnings by displaying the left facing arrows in side bet field 18 and main bet field 19 as shown in FIGS. 2 through 6 and adding the total winnings, if any, to the Credits listed under field 19. If there are winnings the game software also causes the "$Winner$" in row 13 to flash for several seconds. The round of game play of Side Bet Keno is now over and the program exits block 35 to End Game. The game program now waits at Start at the input of block 25 for another round of game play to commence.

In FIG. 8 is shown the pay table for the Side Bet Keno game shown in FIGS. 1 through 6. It should be noted that for the embodiment of the invention disclosed herein that the pay table is the same for the main bet placed by a player before the start of a game of Side Bet Keno and for the side bets. In the far left column entitled "Qty. of # Picked" is listed the quantity of numbers picked by a player before the start of a round of game play of Side Bet Keno. It can be seen that the player may pick between two and ten numbers, but not one number. There are no side bet winnings for matching one number when only one number is selected by the player.

The second column in the pay table is entitled "Number of Hits" and indicates the number of hits or number matches between the two to ten numbers picked by the player and the twenty numbers randomly picked by the game program. The third column is entitled "Winnings Per Bet" and indicates the number of credits won by a player based on the number of hits or number matches for each side bet. This number is multiplied by the number of side bets placed by the player when calculating side bet winnings. It must be remembered from the description of FIGS. 2 through 6 that a player may place side bets on more than one Number of Hits. In those Figures the player placed side bets on four, five and six hits, but not on seven through ten hits.

For one example of how the pay table in FIG. 8 is read, assume that the player has picked 6 numbers in the 8×10 matrix 11 to play. Per the pay table the player can only place side bets on 3 through 6 hits. These numbers are displayed in the side bet field 18. At the same time the player has selected to place side bets on 4 and 5 hits during the round of game play. That is, they will win a side bet if during the round of game play there are either 4 or 5 hits or number matches. If the player has placed one bet on each of 4 and 5 hits, and there is a match during game play, for the one bet the player will win 8 credits for 4 hits and will win 24 credits for 5 hits. If the player had placed three bets on each of 4 and 5 hits, and there is a match during game play, for the three bets the player will win 24 credits for 4 hits and will win 72 credits for 5 hits. If during game play there are 3 or 6 hits the player does not win anything because they did not place any side bets on 3 or 6 hits. The player cannot place side bets on 2, 7, 8, 9 or 10 hits because for 6 player selected numbers the Side Bet field 18 on video display 10 will not display line entries for 2, 7, 8, 9 or 10 hits, alike seen in the pay table in FIG. 8. As a player selects each additional number in the 8×10 matrix 11 prior to Start button 17 being touched the display in Side Bet field 18 dynamically changes to reflect the pay table. These changes in the display in Side Bet field 18 also reflect the number of side bets placed on a number of hits as described in greater detail below for ten player selected numbers.

For another example, assume that the player has picked 8 numbers in the 8×10 matrix 11 to play. Per the pay table the player can only place side bets on 4 hits through 8 hits. At the same time the player has selected to place side bets on 4 hits and 5 hits during the round of game play. That is, they will win a side bet if during the round of game play there are either 4 or 5 hits or number matches. If the player has placed one bet on each of 4 and 5 hits, and there is a match during game play, for the one bet the player will win 5 credits for 4 hits and will win 12 credits for 5 hits. If the player had placed three bets on each of 4 and 5 hits, and there is a match during game play, for the three bets the player will win 15 credits for 4 hits and will win 36 credits for 5 hits. If during game play there are 6, 7 or 8 hits the player does not win anything because they did not place any side bets on 6, 7 or 8 hits. The player cannot place side bets on 2, 3, 9 or 10 hits because for 8 player selected numbers the Side Bet field 18 on video display 10 will not display line entries for 2, 3, 9 or 10 hits, alike seen in the pay table in FIG. 8. As a player selects each additional number in the 8×10 matrix 11 prior to Start button 17 being touched the display in Side Bet field 18 dynamically changes to reflect the pay table. These changes in the display in Side Bet field 18 also reflect the number of side bets placed on a number of hits as described in greater detail in the next paragraph.

For a final example, assume that the player has picked 10 numbers in the 8×10 matrix 11 to play, such as shown in FIGS. 2 through 6. Per the pay table the player can only place side bets on 4 through 10 hits. At the same time the player has selected to place side bets on 4, 5 and 6 hits during the round of game play. That is, they will win a side bet if during the round of game play there are either 4, 5 or 6 hits or number matches. If the player has placed one bet on each of 4, 5 and 6 hits, and there is a match during game play, for the one bet the player will win 2 credits for 4 hits, will win 4 credits for 5 hits, and will win 10 credits for 6 hits. If the player had placed three bets on each of 4, 5 or 6 hits, and there is a match during game play, for the three bets the player will win 6 credits for 4 hits, will win 12 credits for 5 hits, and will win 30 credits for 6 hits. If during game play there are 7, 8, 9 or 10 hits the player does not win a side bet because they did not place a side bet on 7, 8, 9 or 10 hits. The player cannot place side bets on 2 or 3 hits because for 10 player selected numbers the Side Bet field 18 on video display 10 will not display line entries for 2 or 3 hits, alike seen in the pay table in FIG. 8. As a player selects each additional number in the 8×10 matrix 11 prior to Start button 17 being touched the display in Side Bet field 18 dynamically changes to reflect the pay table. These changes in the display in Side Bet field 18 also reflect the number of side bets placed on a number of hits. Thus, for example, in FIG. 6 the player has selected to play ten numbers, and has placed three bets on each of 4, 5 and 6 hits. Each time the player touches the upward facing arrow to increase the bet the adjacent Side Pays number increases. When they place their first bet on 4, 5, and 6 hits the Side Pays column will read 2, 4 and 10. When they place their second bet on 4, 5, and 6 hits the Side Pays column will read 4, 8 and 20. When they place their second bet on 4, 5, and 6 hits the Side Pays column will finally read 6, 12 and 30 as shown in FIG. 6.

Figure 9:
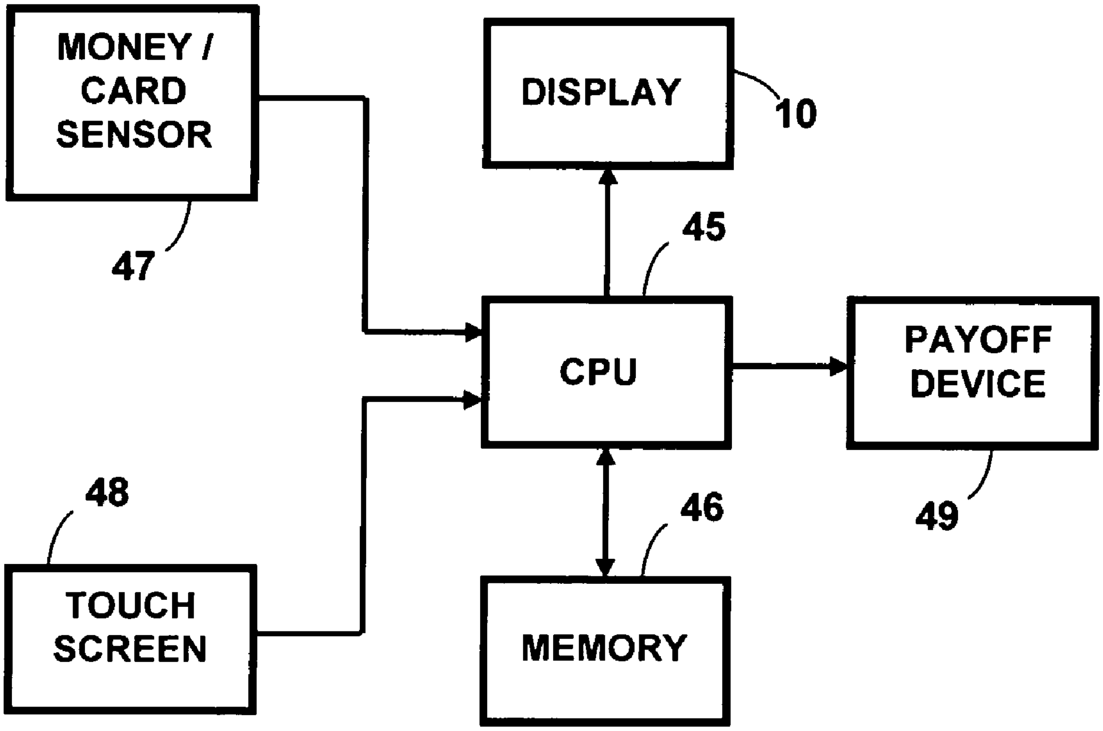
FIG. 9 shows a general block diagram of a video gaming system used to implement the game computer controlled video implementation of the Side Bet Keno game.

In FIG. 9 is shown a general block diagram of the electronic hardware used to implement a computer controlled implementation of the Side Bet Keno video game incorporating the teaching of the present invention. The heart of the computer controlled slot machine is a central processor unit (CPU) 45 running a Side Bet Keno program that is stored in memory 46. The basic operations of a Keno Game are well known in the art and are not repeated here for the sake of brevity. Responsive to the Side Bet Keno game program CPU 45 causes a display on display 10 as shown in FIGS. 1 through 6. Coupled with display 10 is touch screen 48 apparatus that is well known in the art and indicates to CPU 45 when and where a player has touches ones of the on-screen buttons displayed on display 10 as previously described.

The Side Bet Keno video game may have a slot for inserting coins or tokens for placing a number of wagers or bets for each round of game play. Alternatively, there may be a slot for the insertion of a debit card from which CPU 45 debits the number of credits or bets placed by a player, and to which CPU 45 credits any game winnings. These monetary functions are shown at the box entitled Money/Card Sensor 47 which is connected to CPU 45 to receive indications of coin or token insertions, and to read and write a debit card under control of CPU 45. Also, when there is a slot for insertion of coins or tokens there will be a tray into which winnings in the form of coins or tokens are dispensed. This tray is shown as Payoff Device 49 which is controlled by CPU 45 to dispense winnings in the form of coins or tokens.

Using touch screen 48 CPU 45 monitors a player touching on-screen buttons described with reference to FIGS. 1 through 6 and responds accordingly to implement game functions as previously described.

While what has been described hereinabove are several examples of Side Bet Keno game play per the preferred embodiment of the invention, it should be understood that numerous changes maybe made without departing from the spirit and scope of the invention.

The invention claimed is:

1. A method for playing a computer controlled video Keno game wherein a player places a bet and selects a first set of numbers to be played, a second set of numbers is randomly selected by the computer controlled game that are compared to the first set of numbers to determine winnings based on the number of matches between the first and second set of numbers, wherein the improvement comprises the steps of: (a) selecting one or more of the possible number matches between the first and second set of numbers; (b) placing a side bet on the one or more of the possible number matches between the first and second set of numbers selected in step (a); and (c) paying winnings to the player on the side bet of step (b) when there is a match between one of the selected one or more of the possible number matches of step (a) and the actual number of matches between the first and second set of numbers during game play, wherein the possible number matches between the first and second set of numbers that may be selected in step (a) is less than all the possible number matches between the first and second set of numbers.

2. The method for playing a computer controlled video Keno game of claim 1 wherein the winnings paid to the player in step (c) change depending on the quantity of numbers in the first set of numbers selected by the player to be played.

3. The method for playing a computer controlled video Keno game of claim 2 wherein the player decides upon and places the side bets of step (b).

4. The method for playing a computer controlled video Keno game of claim 3 wherein the player may place different side bets in step (b) on different ones of the possible number matches between the first and second set of numbers selected in step (a).

5. A method for playing a computer controlled video Keno game wherein a player places a bet and selects a first set of numbers to be played, a second set of numbers is randomly selected by the computer controlled game that are compared to the first set of numbers to determine winnings based on the number of matches between the first and second set of numbers, wherein the improvement comprises the steps of: (a) selecting one or more of the possible number matches between the first and second set of numbers; (b) placing a side bet on the one or more of the possible number matches between the first and second set of numbers selected in step (a); and (c) paying winnings to the player on the side bet of step (b) when there is a match between one of the selected one or more of the possible number matches of step (a) and the actual number of matches between the first and second set of numbers during game play, wherein the player may place different side bets in step (b) on different ones of the possible number matches between the first and second set of numbers selected in step (a).

6. The method for playing a computer controlled video Keno game of claim 5 wherein the player selects one or more of the possible number matches between the first and second set of numbers in step (a).

7. The method for playing a computer controlled video Keno game of claim 6 wherein the winnings paid to the player in step (c) change depending on the quantity of numbers in the first set of numbers selected by the player to be played.

8. A method for playing a computer controlled video Keno game wherein a player places a bet and selects a first set of numbers to be played, a second set of numbers is randomly selected by the computer controlled game that are compared to the first set of numbers to determine winnings based on the number of matches between the first and second set of numbers, wherein the improvement comprises the steps of: (a) selecting one or more of the possible number matches between the first and second set of numbers; (b) placing a side bet on the one or more of the possible number matches between the first and second set of numbers selected in step (a); and (c) paying winnings to the player on the side bet of step (b) when there is a match between one of the selected one or more of the possible number matches of step (a) and the actual number of matches between the first and second set of numbers during game play, wherein the player decides upon and places the side bets of step (b), and wherein the winnings paid to the player in step (c) change depending on the quantity of numbers in the first set of numbers selected by the player to be played.

9. The method for playing a computer controlled video Keno game of claim 8 wherein the player selects one or more of the possible number matches between the first and second set of numbers in step (a).

10. A method for playing a computer controlled video Keno game wherein a player places a bet and selects a first set of numbers to be played, a second set of numbers is randomly selected by the computer controlled game that are compared to the first set of numbers to determine winnings based on the number of matches between the first and second set of numbers, wherein the improvement comprises the steps of: (a) selecting one or more of the possible number matches between the first and second set of numbers; (b) placing a side bet on the one or more of the possible number matches between the first and second set of numbers selected in step (a); and (c) paying winnings to the player on the side bet of step (b) when there is a match between one of the selected one or more of the possible number matches of step (a) and the actual number of matches between the first and second set of numbers during game play, wherein the winnings paid to the player in step (c) change depending on the quantity of numbers in the first set of numbers selected by the player to be played.

11. The method for playing a computer controlled video Keno game of claim 10 wherein the player selects one or more of the possible number matches between the first and second set of numbers in step (a).

* * * * *